W. S. LEWIS.
POWER TRANSMITTING MECHANISM.
APPLICATION FILED NOV. 28, 1916.
1,241,864.
Patented Oct. 2, 1917.
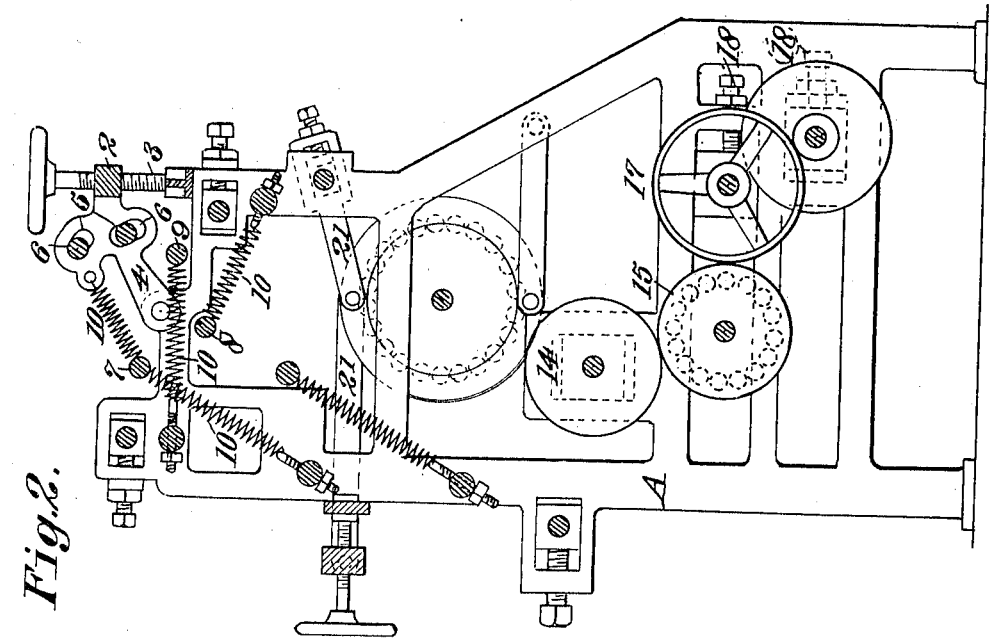
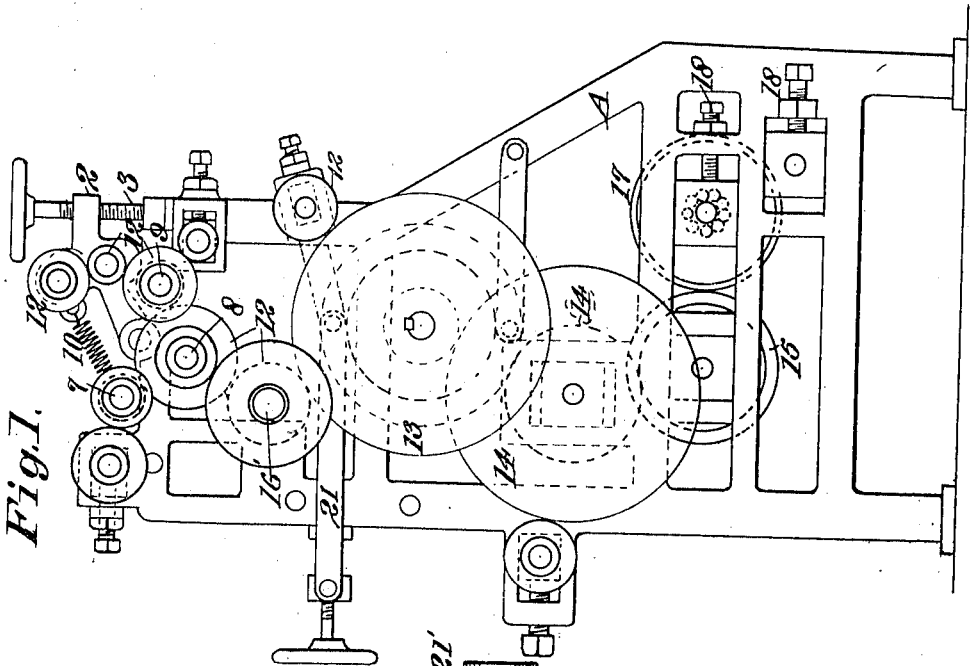
WITNESSES:
INVENTOR
Walter S. Lewis

UNITED STATES PATENT OFFICE.

WALTER S. LEWIS, OF SAN FRANCISCO, CALIFORNIA.

POWER-TRANSMITTING MECHANISM.

1,241,864. Specification of Letters Patent. Patented Oct. 2, 1917.

Application filed November 28, 1916. Serial No. 133,866.

*To all whom it may concern:*

Be it known that I, WALTER S. LEWIS, a citizen of the United States, residing at the city and county of San Francisco and State of California, have invented a new and useful Power-Transmitting Mechanism, of which the following is a specification.

My invention relates to a disposition and arrangement of a series of rollers for transmitting motion and pressure, and in the provision of anti-frictional bearings upon which the rollers are carried, and in means by which the pressure upon the rollers may be varied and adjusted.

It also comprises details of construction which will be more fully explained by reference to the accompanying drawings, in which—

Figure 1 is a side elevation of the apparatus.

Fig. 2 is a vertical section.

Fig. 3 is a section showing one of the bearings.

A is a frame formed of vertical and transverse members adapted to support the shafts and their bearings. Above the top of the frame A is an arm 2, through one end of which passes a screw 3, by the turning of which the arm may be raised or lowered. Projecting from this arm are arms 4, having slots 5 made in them to receive the ends of the shafts 6.

Shafts 7, 8 and 9 are fixed in the main frame A and they are connected by spiral springs 10 which tend to draw the shafts toward each other. These springs have screws and nuts by which any desired degree of tension may be produced, and a corresponding pressure will be brought upon the shafts and the pulleys or rollers borne by them. The rollers 12 are mounted upon these shafts and their faces may be pressed by the springs and adjusting nuts into any desired degree of peripheral pressure. Beneath these rollers are the larger rollers 13, 14 and 15, each having contact with the other and there is an intermediate contacting roller 16, by which an adjustable pressure may be transmitted between the first and second group of rollers. From these latter pressure may be adjustably transmitted to the rim of a wheel 17, which has a pressure regulator 18, each having nuts and screws for that purpose. This roller 13 is suspended by links 21 and also has adjustments between it and the roller 16.

The shafts which are fixed in their frame bearings are provided with anti-frictional bearings upon which the rollers are borne and retained in position as they rotate. These are constructed as follows: Upon the shaft, as 16′, is a fixed collar 20, and at each end of and a little beyond it are fixed disks 21′. Between these disks is a hub sleeve 22 for the roller, and this is supported upon ball bearings which run in the channel between the part 20 and the disks 21′. By this means the rollers are carried by the shafts but out of contact with them and with the least possible friction in the transmission of motion through this part of the apparatus.

Having thus described my invention, what I claim and desire to secure by Letters Patent is—

1. In mechanism for transmitting motion, a frame having shaft bearings, a roller journaled in one frame bearing, a second roller on the frame spaced from the first roller, a third roller frictionally connecting the first and second rollers, spring means tending to move the third roller between the first two rollers into closer contacting relation therewith, and adjustable spring means for exerting an opposite force on said third roller to control the action of said first means.

2. In a mechanism for transmitting motion, a frame having shaft bearings, a roller journaled in one frame bearing, a second roller on the frame spaced from the first roller, a third roller frictionally connecting the first and second rollers, an adjustable spring connected to the third roller for exerting a pull thereon to draw it into closer contact with the first two rollers, an arm pivoted at one end to the frame, a spring connecting the opposite end of the arm to the third roller to exert a pull thereon opposing that of the first spring, and means for adjusting the arm to vary the tension of the second spring.

3. In a mechanism for transmitting motion, a frame having shaft bearings, a roller journaled in one frame bearing, a second roller on the frame spaced from the first roller, a third roller frictionally connecting the first and second rollers, an adjustable spring connected to the third roller for exerting a pull thereon to draw it into closer contact with the first two rollers, an arm pivoted at one end to the frame, a spring connecting the opposite end of the arm to the third roller to exert a pull thereon opposing that of the first spring, a roller journaled in the arm, an adjusting screw carried by the outer end of the arm and bearing on the frame for varying the tension of the second spring, and means connecting the second and fourth rollers.

4. In a mechanism for transmitting motion, a frame having shaft bearings, a roller journaled in one frame bearing, a second roller on the frame spaced from the first roller, a third roller frictionally connecting the first and second rollers, an adjustable spring connected to the third roller for exerting a pull thereon to draw it into closer contact with the first two rollers, an arm pivoted at one end to the frame, a spring connecting the opposite end of the arm to the third roller to exert a pull thereon opposing that of the first spring, said arm having spaced elongated bearings, frictionally connected rollers journaled in the arm bearings, a connecting roller frictionally connecting one of said arm-supported rollers to the second roller, a spring tending to move said connecting roller into closer contact with and between the rollers it connects, and means for adjusting the arm, the rollers supported by the latter adjusting themselves in the elongated arm bearings.

5. In a mechanism for transmitting motion, a frame having shaft bearings, a roller journaled in one frame bearing, a second roller journaled in the frame, a spring for each roller yieldingly holding the rollers in frictional contact with each other, a third roller, a ring-like journal member supporting the same, an arm pivotally connecting the journal member to the frame, and means to adjust the journal member on the arm for moving the third roller toward and from the second roller.

6. In a motion transmitting mechanism, a frame, a roller journaled thereon, a second roller spaced from the first roller, a third roller for connecting the first two rollers, adjustable spring means exerting a pull on the third roller between the first two rollers, and variable means exerting a pull on the third roller obtusely angular to the pull by the first means.

7. In a motion transmitting mechanism, a frame, a roller journaled thereon, a second roller spaced from the first roller, a third roller for connecting the first two rollers, adjustable spring means exerting a pull on the third roller between the first two rollers, a pair of yieldably mounted rollers contacting with the second roller, and means yieldably tending to pull the latter between said pair of rollers.

8. In a motion transmitting mechanism, a frame, a roller journaled thereon, a second roller spaced from the first roller, a third roller for connecting the first two rollers, adjustable spring means exerting a pull on the third roller between the first two rollers, an arm pivoted at one end to the frame, a roller journaled therein, a roller connecting the last roller to the second roller, and resilient means exerting a pull on the second connecting roller in a direction between the second and fourth rollers.

9. In a motion transmitting mechanism, a frame, a roller journaled thereon, a second roller spaced from the first roller, a third roller for connecting the first two rollers, adjustable spring means exerting a pull on the third roller between the first two rollers, an arm pivoted at one end to the frame, a roller journaled therein, a roller connecting the last roller to the second roller, resilient means exerting a pull on the second connecting roller in a direction between the second and fourth rollers, a roller contacting with the second roller on the opposite side from the second connecting roller, and resilient means exerting a pull on the second roller from the third roller and in a direction between the second connecting roller and the sixth roller.

10. In a motion transmitting mechanism, a frame, a roller journaled thereon, a second roller spaced from the first roller, a third roller for connecting the first two rollers, adjustable spring means exerting a pull on the third roller between the first two rollers, an arm pivoted at one end to the frame, a roller journaled therein, a roller connecting the last roller to the second roller, resilient means exerting a pull on the second connecting roller in a direction between the second and fourth rollers, a roller contacting with the second roller on the opposite side from the second connecting roller, resilient means exerting a pull on the second roller from the third roller and in a direction between the second connecting roller and the sixth roller, a ring-like journal member pivotally connected to the frame, and a roller rotatable in the journal member and contacting with the sixth roller.

11. In a motion transmitting mechanism, a frame, a roller journaled thereon, a second roller spaced from the first roller, a third roller for connecting the first two rollers, adjustable spring means exerting a pull on the third roller between the first two rollers, an arm pivoted at one end to the frame, a roller journaled therein, a roller connecting the last roller to the second roller, resilient means exerting a pull on the second connecting roller in a direction between the second and fourth rollers, a roller contacting with the second roller on the opposite side from the second connecting roller, resilient means exerting a pull on the second roller from the third roller and in a direction between the second connecting roller and the sixth roller, a ring-like journal member pivotally connected to the frame, a roller rotatable in the journal member and contacting with the sixth roller, and means for positively adjusting the journal member to move its roller in directions toward and from the seventh roller.

12. In a motion transmitting mechanism, a frame, a roller journaled thereon, a second roller spaced from the first roller, a third roller for connecting the first two rollers, adjustable spring means exerting a pull on the third roller between the first two rollers, an arm pivoted at one end to the frame, a roller journaled therein, a roller connecting the last roller to the second roller, resilient means exerting a pull on the second connecting roller in a direction between the second and fourth rollers, and a spring connecting the third roller to the arm.

In testimony whereof I have hereunto set my hand in the presence of two subscribing witnesses.

WALTER S. LEWIS.

Witnesses:
JOHN H. HERRING,
W. W. HEALEY.